US012655920B2

(12) United States Patent
Salah

(10) Patent No.: US 12,655,920 B2
(45) Date of Patent: Jun. 16, 2026

(54) METHOD FOR COMPENSATING FOR TOLERANCES, PLAY AND ELASTICITY IN A MOTOR-DRIVEN HYDRAULIC VALVE

(71) Applicant: Bucher Hydraulics GmbH, Klettgau (DE)

(72) Inventor: Gerd Salah, Hennef-Blankenbach (DE)

(73) Assignee: BUCHER HYDRAULICS GMBH, Klettgau (DE)

( * ) Notice: Subject to any disclaimer, the term of this patent is extended or adjusted under 35 U.S.C. 154(b) by 291 days.

(21) Appl. No.: 18/490,144

(22) Filed: Oct. 19, 2023

(65) Prior Publication Data

US 2024/0133485 A1      Apr. 25, 2024
US 2024/0229968 A9      Jul. 11, 2024

(30) Foreign Application Priority Data

Oct. 25, 2022     (EP) ..................................... 22203533

(51) Int. Cl.
*F16K 37/00*          (2006.01)
*F16K 31/04*          (2006.01)
(52) U.S. Cl.
CPC .......... *F16K 37/0083* (2013.01); *F16K 31/04* (2013.01)

(58) Field of Classification Search
CPC ........ F16K 37/0083; F16K 31/04; H02P 8/00; G01M 13/003
See application file for complete search history.

(56) References Cited

U.S. PATENT DOCUMENTS

| | | | | |
|---|---|---|---|---|
| 10,673,361 B2 * | 6/2020 | Liniger | ..................... | H02P 8/08 |
| 12,044,328 B2 * | 7/2024 | Salah | ..................... | F15B 13/10 |

FOREIGN PATENT DOCUMENTS

| | | |
|---|---|---|
| EP | 2003771 | 12/2008 |
| EP | 3142244 | 3/2017 |
| WO | 2017017557 | 2/2017 |

* cited by examiner

*Primary Examiner* — Eric Keasel
(74) *Attorney, Agent, or Firm* — BainwoodHuang

(57) ABSTRACT

Techniques involve detecting a mechanical play ($W_s$) in a system having a hydraulic valve and a valve drive for driving the hydraulic valve. A valve slide, which is driven by the valve drive of the hydraulic valve, is clamped with at least one return spring which is designed, in the case of a de-energized valve drive, to push the valve slide from any arbitrary valve slide position back into a neutral position of the valve slide.

13 Claims, 4 Drawing Sheets

METHOD FOR COMPENSATING FOR TOLERANCES, PLAY AND ELASTICITY IN A MOTOR-DRIVEN HYDRAULIC VALVE

The invention relates to a method for compensating for tolerances, play and elasticity in a motor-driven hydraulic valve.

Such hydraulic valves are preferably configured with a return spring which, in the event of a power failure, presses a valve slide of the valve mechanically into a safe position in which no hydraulic fluid can flow through the hydraulic valve. Such hydraulic valves usually have a P connection at which a supply pressure is present and a T connection which is connected to a return. The P connection can be selectively connected to a connection A (A connection) or to a connection B (B connection) through the setting of the valve slide, with the result that hydraulic liquid from the P connection is then provided at the respective connection A or B. The other connection B or A is then connected to the T connection such that here the hydraulic liquid can flow off from the connection into the return. An actuating region of the valve slide in which no fluid can flow from the P connection to the connections A or B or from A or B to T (the aforementioned safe position) is also termed overlap. The safe position is usually also referred to as zero position or neutral position.

The valve drive of such hydraulic valves is preferably realized with an electric motor (for example a stepper motor or a brushless direct current (BLDC) motor) which actuates a valve slide of the hydraulic valve. The valve slide and the motor are usually coupled to one another by a gear mechanism. The gear mechanism can have either a 1-stage or multistage design. For example, a one-stage gear mechanism regularly comprises at least one rack on the valve slide and a toothed wheel on the motor, wherein the motor with the toothed wheel drives the rack on the valve slide and converts a rotary movement on the stepper motor into a linear movement on the rack/on the valve slide.

A zero position is regularly realized by a double-clamped return spring which brings the valve slide into the zero position if no current is present at the motor or the current that is present is reduced to such an extent that the spring force is sufficient to override the spring force.

Particularly on account of the gear mechanism, but also on account of other components, such as the stepper motor and the hydraulic valve itself, a certain play and a certain elasticity and also tolerances are regularly present in the system consisting of the hydraulic valve and the valve drive. Technically, such tolerances, play and elasticity have the effect that, with a change of direction of the movement, the motor regularly has to be additionally moved by an additional distance or (in the case of a stepper motor as motor) a pair of steps before a desired movement of the valve slide occurs.

For certain applications of such hydraulic valves, it is very helpful to compensate for tolerances, play and elasticity in the system. To make this compensation possible, it is advantageous if the tolerances, the play or the elasticity are known—for example in the form of a stored parameter, for example a parameter which indicates how many steps a stepper motor additionally has to be moved during a change of direction of the movement of the valve slide.

A method for compensating for a play in a system consisting of a hydraulic valve and valve drive is known, for example, from international patent application WO 2017/017557 A1. According to the procedure described therein, upon each start of the system, a stepper motor in the valve drive is initially moved in the one direction with a reduced drive current until the stepper motor cannot move the valve slide further with the reduced drive current. This point is detected on the basis of a step loss. The valve slide is then moved in the other direction with the reduced drive current until the stepper motor cannot move the valve slide further. This point is also detected on the basis of a step loss. The play of the gear mechanism is detected on the basis of these two points and in particular on the basis of the measurement of the number of steps which the stepper motor covers between these two points.

When using a stepper motor as motor, the controller of the valve drive of such hydraulic valves preferably has a step loss detection module by means of which the step loss can be detected. A step loss is distinguished in particular by a slip occurring in the motor or in the valve drive. If the stepper motor obtains a step target from its controller and the drive currents provided for carrying out the step are applied to the stepper motor and the stepper motor nevertheless does not perform the step, this is a slip in the stepper motor and a step loss. A possible way of step loss detection is described in detail in European patent EP 3 142 244 B1, for example. However, various possibilities for detecting step losses of a stepper motor are known. The possibility of detecting step losses is highly advantageous for the efficient operation of such valves. However, in principle, the step loss detection is not necessary in order to carry out the method described here. It is also possible for other methods to be used to detect if a motor is no longer capable of carrying out a movement which is predetermined by a controller. In the case of a BLDC motor, it is possible, for example, for an overload detection to be used for this purpose.

It is an object of the present invention to specify a method for detecting a mechanical play in hydraulic valves that is particularly advantageous in relation to the prior art. This object is achieved by the invention according to the features disclosed herein. Further advantageous embodiments are disclosed in the description and in particular also in the description of the figures. It is pointed out that a person skilled in the art will combine the individual features with one another in a technically meaningful way and thus arrive at further embodiments of the invention.

The invention relates to a method for detecting a mechanical play in a system having a hydraulic valve and a valve drive for driving the hydraulic valve, wherein a valve slide, which is driven by the valve drive, of the hydraulic valve is clamped with at least one return spring which is designed, in the case of a de-energized valve drive, to push the valve slide from any arbitrary valve slide position back into a neutral position of the valve slide, comprising the following steps:

a) moving the valve slide by the valve drive in a first direction up to a first valve slide position outside a neutral position;

b) reducing the current at the valve drive such that the valve slide is moved by the return spring in a second direction opposite to the first direction back into the neutral position;

c) moving the valve slide by the valve drive further in the second direction up to a defined second position outside the neutral position and determining a first path from the neutral position to the defined second position;

d) reducing the current at the valve drive such that the valve slide is moved by the return spring in the first direction back into the neutral position;

e) moving the valve slide by the valve drive in the second direction up to the defined second position outside the neutral position and determining a second path from the neutral position to the defined second position; and f) calculating the play as difference between the second path and the first path.

The method can be used in principle in systems having a hydraulic valve with a valve slide and a valve drive connected thereto for actuating the valve slide. This applies irrespective of the type of motor provided in the valve drive. Such motors can be, for example, stepper motors or else brushless direct current (BLDC) motors. Where the term "stepper motor" is used below, this is to be understood generically for any type of motor, with stepper motors being a preferred embodiment in which the movement of the motor can be monitored via the number of the steps.

In principle, in such systems with a hydraulic valve and valve slide there is a mechanical coupling between the motor of the valve drive and the valve slide of the hydraulic valve. If a rotor of the motor is moved, the valve slide is correspondingly also moved proportionally. The mechanical coupling of the motor and of the valve slide usually occurs via a gear mechanism. The term "gear mechanism" is to be understood generically here. One possible variant is a gear mechanism consisting of at least one toothed wheel and rack for converting a rotational movement of the motor into a linear movement of the valve slide. The design of the gear mechanism is not decisive for the operating principle of the method described here. For example, it would also be possible to use (as gear mechanism) worm gears, crankshafts, spindles or belts for the mechanical coupling of motor and valve slide.

The method presents a new way for detecting the mechanical play that differs from known methods in that the measurement of the play is not carried out by movement against points or stops in both directions of movement of the valve slide (first direction and second direction). Instead, the valve slide is moved by the return spring form both directions (passively) into the neutral position. This results in various positions of the valve slide within the neutral position that can be used for detecting a play. After step b) und d), the valve slide or the valve drive or a stepper motor remains at another location or at different positions within the neutral position. The distance between these positions can be calculated if the paths from these positions to a defined position can be determined or measured. This occurs in steps c) and e). The play can be calculated (step f) on the basis of the difference of these paths.

A "defined position" (here the defined second position according to steps c) and e)) means that it can be reliably detected that the valve slide is situated in this defined position. This can occur in different ways which will be explained more precisely below. It is only important that the detection is possible reliably and repeatably such that, in step c) and e), in each case the same defined second position is detected. Ensuring that the defined second position in step c) and in step e) is identical is also associated with the fact that the movements for approaching this defined position are in the same direction (second direction) starting from the neutral position. These movements serve for determining the paths from which the play can be determined as difference.

It should be noted that the defined second positions moved to in step c) and e) are to be distinguished from the first position. The first position does not have to be defined. That is to say: it is not required that this position is reliably repeated, detectable or registerable.

The movement in step a) in the opposite first direction serves to bring the system into an initial position for carrying out the method, with the result that step b) can be suitably carried out. The first direction in which the system is moved in step a) is preferably stored. In principle, while carrying out the method described and also during other operation of the system used here consisting of hydraulic valve and valve drive, the direction in which the valve slide or the valve drive has last been moved is always stored. This information can be used in order, together with the parameter for the play that is determined using the method described here, to compensate for the play. This will be discussed in more detail below. Owing to the properties of the system, the initialization of the method does not require the first position moved to in step a) to be exactly defined. Why this is the case will be explained in detail later.

What is meant by the term "play" here is in particular a total play which is present in the system. The play usually also includes elasticities in the system and possibly also manufacturing tolerances. Here, the term "play" thus means in particular a play which is possibly predetermined on account of design, manufacturing tolerances and elasticities in the system.

The method can be carried out on the test bench or in the terminal device in the field and be used with different embodiments and details in various situations of the operation of a hydraulic valve.

Not only can the play be detected using the method, but it is also possible, where appropriate, for checking of the mode of operation of the return spring and the control of the hydraulic valve and in particular the mode of operation of a step loss detection or an overload detection to be determined.

In principle, a distinction is made here between different operating modes during the operation of the valve drive. There is the possibility of moving the valve drive, as occurs, for example, in steps a), c) and e). Drive currents then preferably act in the valve drive and cause the motor to carry out predetermined steps or to cover a predetermined distance such that the valve slide moves according to the specification. There is also the possibility of holding the valve drive in a defined position. Drive currents then preferably likewise act in the valve drive that are suitable for holding the valve drive and thus the valve slide at a position—also counter to acting external forces which are exerted, for example, by the return spring or other force sources on the valve drive or the valve slide. Moreover, there is the operating mode which is used in step b) and d) and which has the effect that the return spring controls the movement of the valve slide. In this operating mode, the current that is present at the valve drive is reduced to such an extent that the forces exerted by the return spring exceed the forces exerted by the valve drive, or that in particular the forces exerted by the return spring move the valve slide into the safe position. This operating mode can also be a "de-energized" operating mode. This operating mode can also be an operating mode with deactivated valve drive in which preferably the valve drive in particular applies no forces at all to the valve slide. In each case, the current is reduced with respect to the "normal operation" for moving or holding the valve slide in certain valve slide positions. Therefore, the term "reduction" for the current at the valve drive used here in step b) and d) also comprises a possible deactivation or de-energization of the valve drive. In this operating mode, the valve drive is not driven. The position of the valve slide is then influenced by the return spring. Where appropriate, the mass of the valve slide and of the valve drive mechanically coupled to the valve slide acts on the speed of the forces caused by return spring. The valve slide is always moved into the zero position in the operating mode according to step b) and d) with reduced current at the valve drive or in the activated or de-energized operating state.

It is particularly advantageous if the neutral position of the valve slide is a neutral position region which extends from a first neutral position end position up to a second neutral position end position, wherein, in step b), the valve slide is pressed by the return spring into the second neutral position end position and, in step d), the valve slide is pressed by the return spring into the first neutral position end position.

The neutral position is preferably described with respect to the valve drive or the stepper motor. A proportion of the play between the valve drive and the valve slide is reflected in the length of the neutral position region between the two neutral position end positions. For this reason, the valve slide position taken as a basis in the method described here is not necessarily to be equated with an actual (physical) valve slide position. Rather, the valve slide position is at least partially determined on the valve drive (in particular on the stepper motor) and, if a play between the stepper motor and the valve slide occurs, there could possibly arise deviations between the actual (physical) valve slide position and the measured valve slide position taken as a basis for the method described here. This relationship will be explained in more detail below on the basis of FIGS. 3 and 4.

Preferably, no defined forces act on the valve slide within the neutral position. However, a certain internal friction preferably exists in the system and has the effect that the valve slide and/or the valve drive or the stepper motor are not moved back and forth in a completely uncontrolled manner within the neutral position. The length of the neutral position along the possible valve slide positions regularly corresponds to the play in the system consisting of hydraulic valve and valve drive.

The finding that, when the valve slide is brought into neutral position by the return spring, it always remains at the neutral position end position, which is opposite to the direction starting from which the valve slide is moved into the neutral position end position, is very important for the method described. This is because the return spring accelerates the valve slide and no (substantial) resistances act on the valve slide within the neutral position, with the result that the valve slide is always moved through the neutral position up to the opposite neutral position end position.

It is also advantageous if the neutral position of the valve slide is arranged within an overlapping region between two opening points of the hydraulic valve, wherein hydraulic lines of the hydraulic valve are closed if the valve slide position lies within the overlapping region and an opening of hydraulic lines begins at the two opening points.

Preferably, the system with the hydraulic valve and the valve drive has such an overlapping region. The overlapping region makes it possible, inter alia, to ensure that, during operation of the hydraulic valve, hydraulic liquid is provided either at a first outlet or at a second outlet of the hydraulic valve and, when the valve slide moves over the overlapping region, there always results a sufficient time interval between the provision of the hydraulic liquid at the first outlet and the second outlet or an operator of the hydraulic valve, starting from the overlapping region, can in a targeted manner either effect provision of hydraulic liquid at the first outlet or provision of hydraulic liquid at the second outlet.

Moreover, it is advantageous if, in step a), a defined safe path is traveled which is shorter than a distance between a neutral position end position and the corresponding opening point of the hydraulic valve.

This makes it possible to ensure in any case that, independent of the exact position of the valve slide within the neutral position, the movement toward the first valve slide position in step a) does not cause any opening of the hydraulic valve.

It is also advantageous if the first position moved to in step a) and/or the defined second position moved to are arranged within the overlapping region of the valve slide.

It is particularly advantageous if the valve drive has a stepper motor, wherein a measurement of paths in the method occurs by counting steps of the stepper motor.

Preferably, a control device for controlling the stepper motor is configured to count the covered number of steps during a movement of the stepper motor.

Moreover, it is advantageous if method steps a) to f) are carried out during an initial commissioning of the system and/or during a recommissioning of the system after a repair or maintenance and at least the play calculated in step f) and possibly also further values are stored in a control device for operating the system and are then available for the operation of the system.

Preferably, values and parameters determined using the method described are in particular the play calculated in step f). If this play is determined once, it can be permanently used for each operation of the system in order to control the hydraulic valve in a targeted manner and need not be redetermined during each commissioning.

The determined play or a parameter stored in the system that describes this play is preferably used in an operation, subsequent to the method, of the system together with a stored last movement direction of the valve slide in order to compensate for the play. Preferably, a change of direction is detected by a comparison of the last-used movement direction of the valve slide with the direction of a new specification for the movement of the valve slide. If a change of direction has been detected, compensation for the play can occur in that the valve slide or the valve drive or the motor obtains an additional movement specification which corresponds to the play or the stored parameter for the play.

It is also advantageous if the defined second position moved to in step c) and step e) is an opening point of the hydraulic valve which is detected in step c) and step e) on the basis of a hydraulic property in the hydraulic valve and/or in a hydraulic system connected to the hydraulic valve.

Moreover, it is advantageous if, after step e), the following step is carried out:

g) moving the valve slide in the first direction up to a defined first position;

wherein the defined second position moved to in step c) and step e) and the defined first position moved to in step g) are each opening points of the hydraulic valve which are detected in steps c), e) and g) on the basis of a hydraulic property in the hydraulic valve and/or in a hydraulic system connected to the hydraulic valve.

Preferably, the opening points are also stored in a control device as parameters and values which can be used for the operation of the system. By determining both opening points, the total length of the overlap can likewise be determined as distance (number of steps).

As a result, the method preferably provides a virtual model of the valve consisting of the information relating to the overlap, the play, the opening points and the neutral position end positions.

It is also advantageous if the defined second position moved to in step c) and step e) is defined by a spring force of the return spring of the hydraulic valve, wherein the spring force is detected in the valve drive in step c) and in step e).

Preferably, the defined second position also lies within the overlap. Starting from the neutral position, the spring force of the return spring increases preferably linearly with the distance from the neutral position, to be precise in particular with the distance from the respectively nearest neutral position end position of the neutral position. The spring force can be determined in the valve drive for example on the basis of an electrical current which is required for holding the valve slide in the defined position. Preferably, the electrical holding current is also proportional to the spring force. For this reason, a defined second position can be fixed on the basis of a defined electrical holding current.

Moreover, it is advantageous if the defined second position moved to in step c) and step e) is detected in that the valve drive is controlled with a reduced drive current and a valve slide position which can be reached with this drive current is the defined second position.

It is also advantageous if the defined second position moved to in step c) and step e) is detected on the occurrence of a step loss which occurs on a stepper motor of the valve drive and which is detected with a step loss detection configured therefor in a control device of the valve drive.

The step loss detection is known, for example, from the cited prior art document EP 3 142 244 B1. The step loss detection makes it possible, for a defined drive current, to detect a position of the valve slide—in particular if a drive current of the valve drive or of the stepper motor is reduced to such an extent that the spring force at a position lying within the overlap can no longer be overcome. As soon as a step loss occurs during the movement of the valve slide with the valve drive, the second position defined by the reduced drive current is reached.

It is particularly preferable if method steps a) to f) are carried out during a renewed commissioning of the system after an initial commissioning of the system and/or after a recommissioning of the system after a repair or maintenance and parameters determined with method steps a) to f) are compared with parameters which are stored in a control device and which have been determined during a previous execution of method steps a) to f), and, on the basis of this comparison, wear of the system consisting of hydraulic valve and valve drive and in particular wear of a gear mechanism for mechanically coupling a stepper motor in the valve drive to the valve slide is determined.

In particular, wear can be ascertained if a measured play increases. Where appropriate, an increase in the play over the life of the hydraulic valve can be acceptable if it lies within a tolerance range. The variation in the play over the life of the hydraulic valve can be systematically monitored using the method described in order to carry out an online diagnosis of the hydraulic valve. In the case of unexpected increases in the determined play, a fault or a malfunction of the system can be detected.

An unexpected decrease in the play can also be detected. It can normally be assumed that the play at most increases.

A system having a hydraulic valve and a valve drive, which is configured to carry out the method described, is also intended to be described here.

Such a system is in particular characterized in that the valve slide is braced by a corresponding double-clamped return spring which causes a movement of the valve slide, as is required for carrying out step b) and d) of the method, if the current at the valve drive is correspondingly reduced or the valve drive is deactivated or de-energized.

A control device for a described system, which is configured for carrying out the method described with the hydraulic valve described, is also intended to be described.

In particular a computer program, which is suitable for carrying out the method described, is stored on such a control device.

It should be noted that the particular advantages and design features described in conjunction with the above-described method can also be applied and transferred to the described system and the described control device for operating a system.

There is also intended to be described here a method for operating a system having a hydraulic valve and valve drive for driving the hydraulic valve, wherein a play exists between the valve drive and the valve slide, wherein at least one last drive direction and the play are stored as variables in a control device for controlling the actuation of the valve slide and are taken into consideration during an actuation of the valve slide with the valve drive.

The invention and the technical field of the invention will be described in more detail below on the basis of the figures. The figures show preferred exemplary embodiments, to which the invention is not limited. It should be noted in particular that the figures and in particular the dimensional relationships illustrated in the figures are only schematic. In the figures:

FIG. 1 schematically shows a system consisting of hydraulic valve and valve drive;

Figure 1:
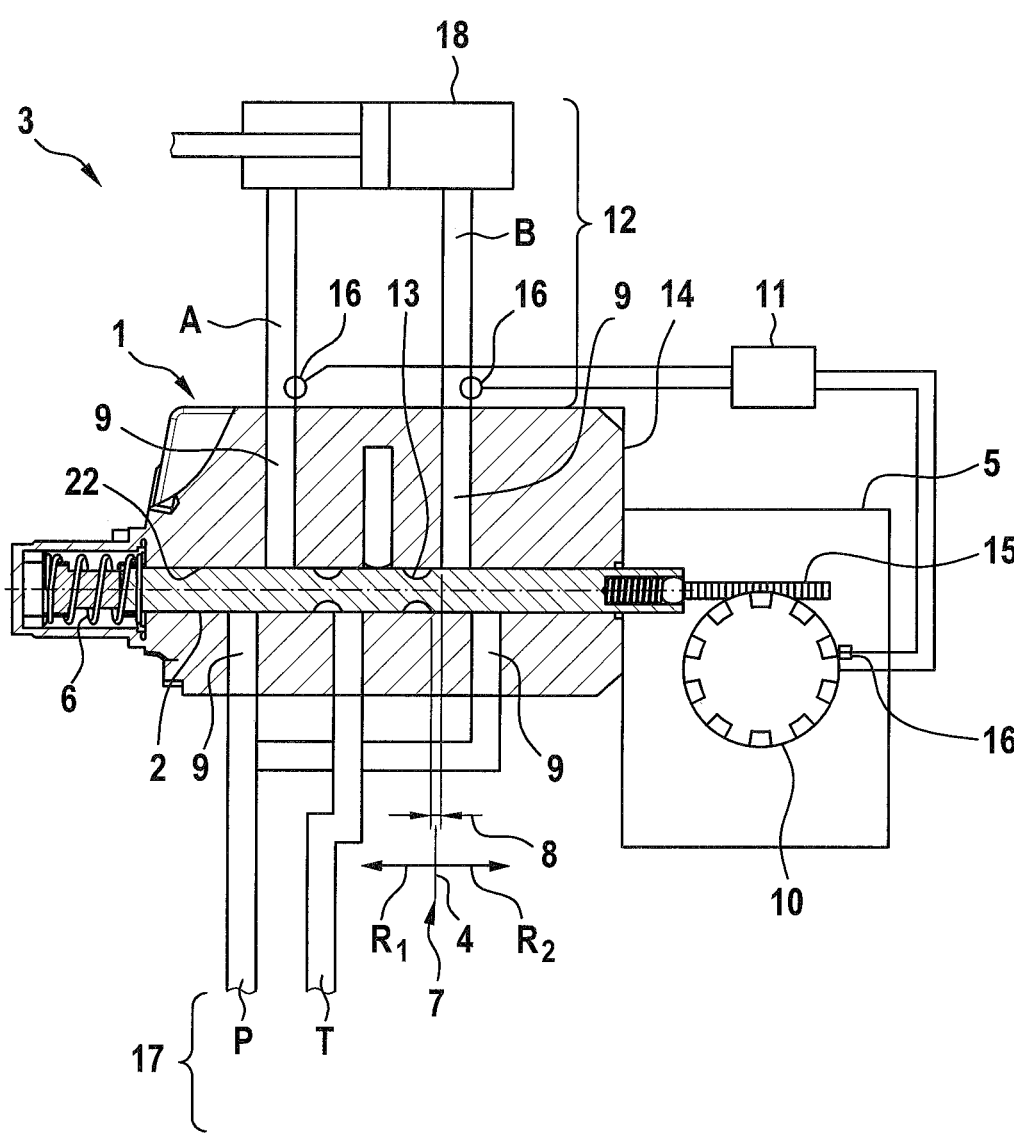

FIG. 1 schematically shows a system 3 having a hydraulic valve 1 and a valve drive 5 for driving the hydraulic valve 1. The hydraulic valve 1 preferably has a first outlet A and a second outlet B and is in particular configured to selectively provide pressurized hydraulic liquid at the first outlet A or at the second outlet B and then to receive it again at the respective other outlet B, A and channel it back to a tank (not shown here). The hydraulic valve 1 preferably has a pressure connection P at which the hydraulic valve 1 is provided with pressurized hydraulic liquid from a hydraulic supply 17. Moreover, the hydraulic valve 1 has a tank connection T at which hydraulic liquid flowing back from the respective other outlet B, A can be discharged.

The hydraulic valve 1 preferably has a valve block 14, in which hydraulic lines 9 are provided, for example as bores, and a valve slide 2 which can be moved back and forth in an axial direction in a control bore 22 and can assume various valve slide positions 7 there. On the valve slide 2 there are preferably provided control structures 13 which can be configured, for example, as cutouts and which, depending on the valve slide position 7, produce or close passages between individual hydraulic lines 9 and thus control the provision of hydraulic liquid at the outlets A, B.

Preferably, the valve slide 2, the control structures 13 formed thereon and the hydraulic lines 9 are formed in such a way that, during a movement of the valve slide 2 in a first direction R1, a first outlet A opens from a first opening point (not explicitly shown here) and, during a further movement in the direction R1, is then opened ever further in order to be able to set a provided volumetric flow of hydraulic liquid at the first outlet A by means of the valve slide position 7. Preferably, the valve slide 2, the control structures 13 formed thereon and the hydraulic lines 9 are further formed in such a way that, during a movement of the valve slide 2 in a second direction R2, a second outlet B opens from a second opening point (not explicitly shown here) and, during a further movement in direction R2, is then opened ever further in order to be able to set a provided volumetric flow of hydraulic liquid at the second outlet B by means of the valve slide position 7.

Preferably, the valve slide 2, the control structures 13 formed thereon and the hydraulic lines 9 are formed in such a way that an overlapping region 8 exists between the valve slide positions 7 at the first opening point and at the second opening point. For valve slide positions 7 within this overlapping region 8, both outlets A and B are preferably closed and hydraulic liquid is not provided at either of the outlets A, B.

Preferably, the valve slide 2 is braced with a return spring 6. The return spring 6 is preferably configured in such a way that the valve slide 2 is moved back into a neutral position 4 by the spring from any arbitrary valve slide position 7 if the valve drive 5 is not driven or is de-energized. The return spring 6 is preferably double-clamped and pushes the valve slide 2 back into the neutral position 4 by deflection in both directions R1, R2. The precise mode of operation of the return spring 6 will be explained in more detail below on the basis of FIGS. 2a, 2b and 2c.

The system 3 with the hydraulic valve 1 and the valve drive 5 serves, for example, to supply a hydraulic system 12 with hydraulic liquid from the hydraulic supply 17. The hydraulic system 12 can comprise, for example, a differential cylinder 18 whose chambers can be connected to the connections A and B. The differential cylinder 18 can then be controlled by the system 3.

The valve drive 5 is preferably connected to the valve slide 2 and configured to actuate the valve slide 2. The valve drive 5 can have, for example, a stepper motor 10 which, via a gear mechanism 15, generates a linear movement which is transmitted to the valve slide 2. The gear mechanism 15 can comprise, for example, a rack (schematically indicated here) and toothed wheels. A play in the valve drive 5 or between the valve drive 5 and the valve slide 2 is caused, for example, by tolerances within the gear mechanism 15 and in particular, for example, by tolerances between racks and toothed wheels of the gear mechanism 15.

Preferably, the system 3 has a control device 11 which is connected to the stepper motor 10 and which, to actuate the stepper motor 10, controls the latter. The control device 11 is preferably configured to monitor the operation of the valve drive 5. For this purpose, sensors 16, which are connected to the control device 11, can be provided in the valve drive 5. The control device 11 is preferably also configured to monitor the operation of the hydraulic valve 1. For this purpose, sensors 16, which are connected to the control device 11, can be provided, for example, on the outlets A, B.

Figure 2A:
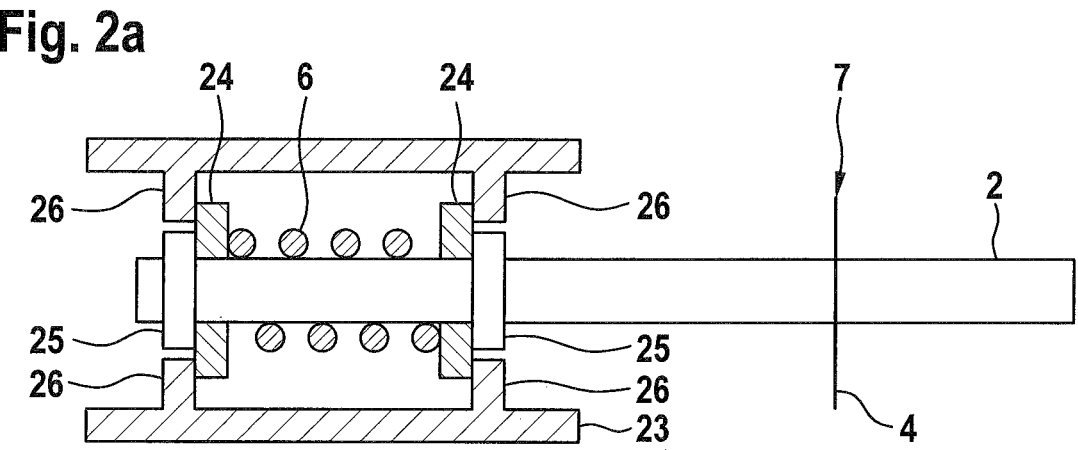
FIGS. 2a, 2b and 2c show a valve slide with return spring in various valve slide positions.
Figure 2B:
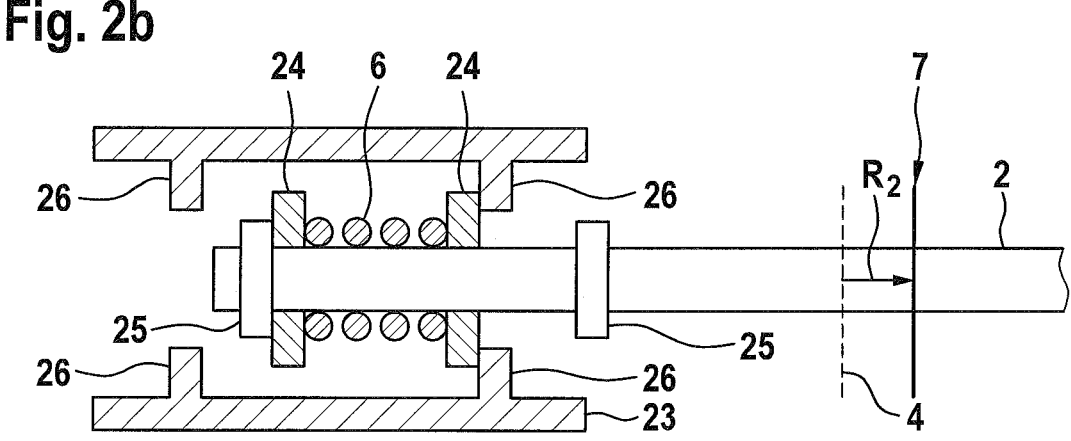
Figure 2C:
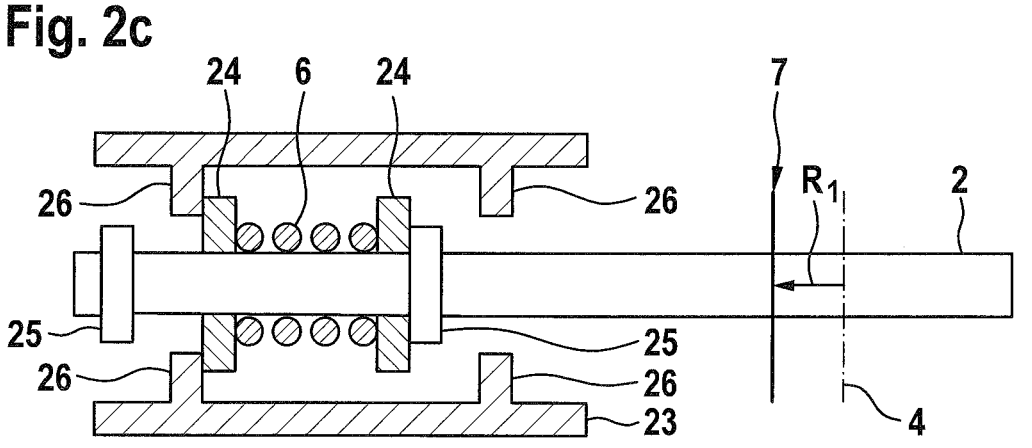

For the operating principle of the described method, the valve slide position 7 and the effect of the return spring 6 on the valve slide position 7 are highly relevant. They are somewhat explained here on the basis of FIGS. 2a, 2b and 2c. FIGS. 2a, 2b and 2c each show the double clamping of the valve slide 2 with the return spring 6. The valve slide 2 preferably has two shoulders 25 which are clamped with the return spring 6 in a clamping device 23. Particularly preferably, there are movable transmission elements 24 which are each pressed against the shoulders 25 and the counter-holding structures 26 of the clamping device 23 by the return spring 6.

In FIG. 2a, the valve slide 2 is shown in a neutral position 4. The valve slide position 7 here corresponds to the neutral position 4. The return spring 6 is under tension and clamps the valve slide 2 or its shoulders 25 in both directions with a pre-tensioning force.

FIG. 2b then shows a deflection of the valve slide position 7 in the second direction R2. FIG. 2c shows a deflection of the valve slide position 7 in the first direction R1. Owing to the type of clamping device 23, the return spring 6 is compressed equally in both directions R1, R2 and there results a spring force which drives the valve slide 2 back into the neutral position 4 according to FIG. 2a.

Figure 3:
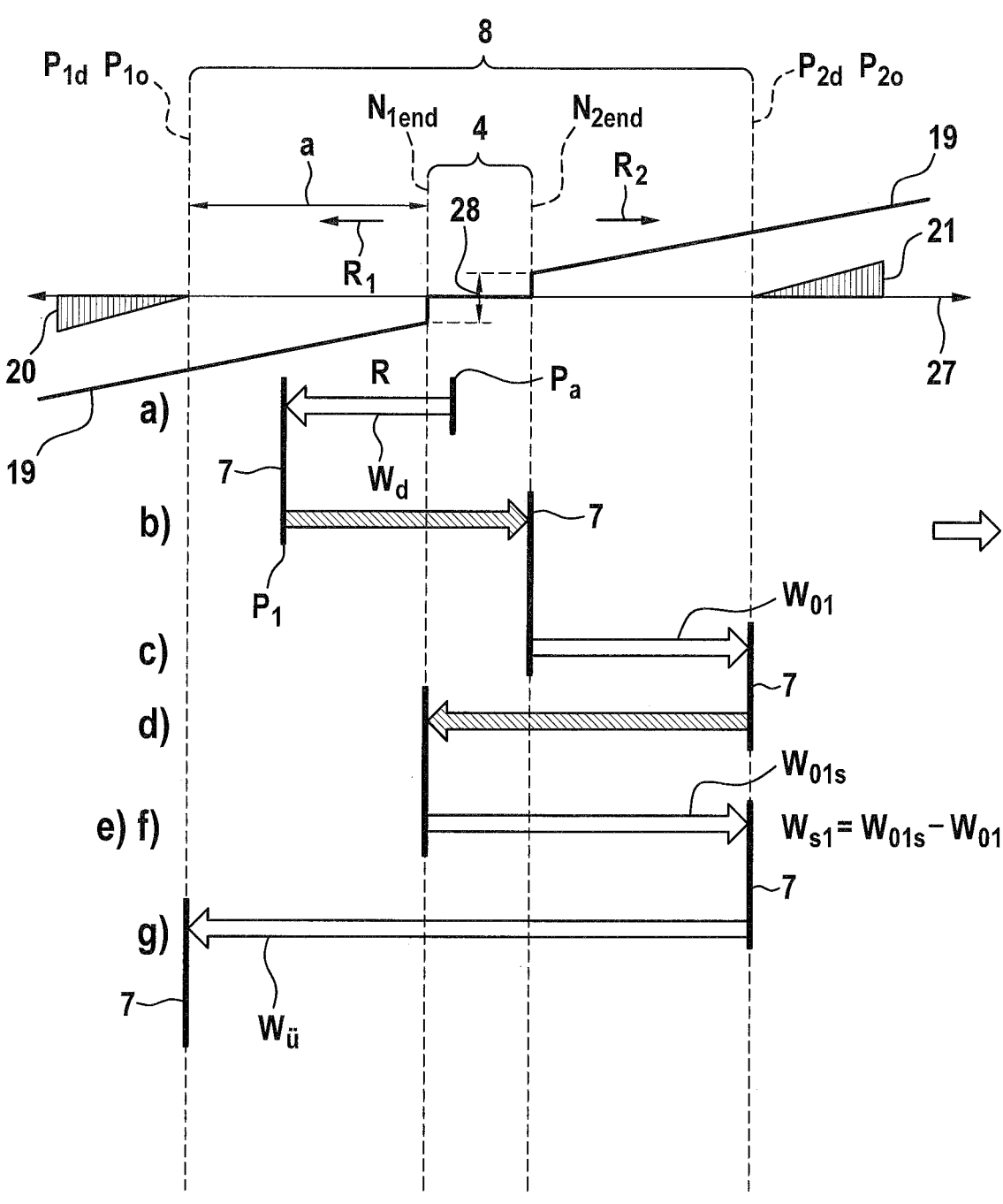
FIG. 3 shows a first flow diagram of the method described.
Figure 4:
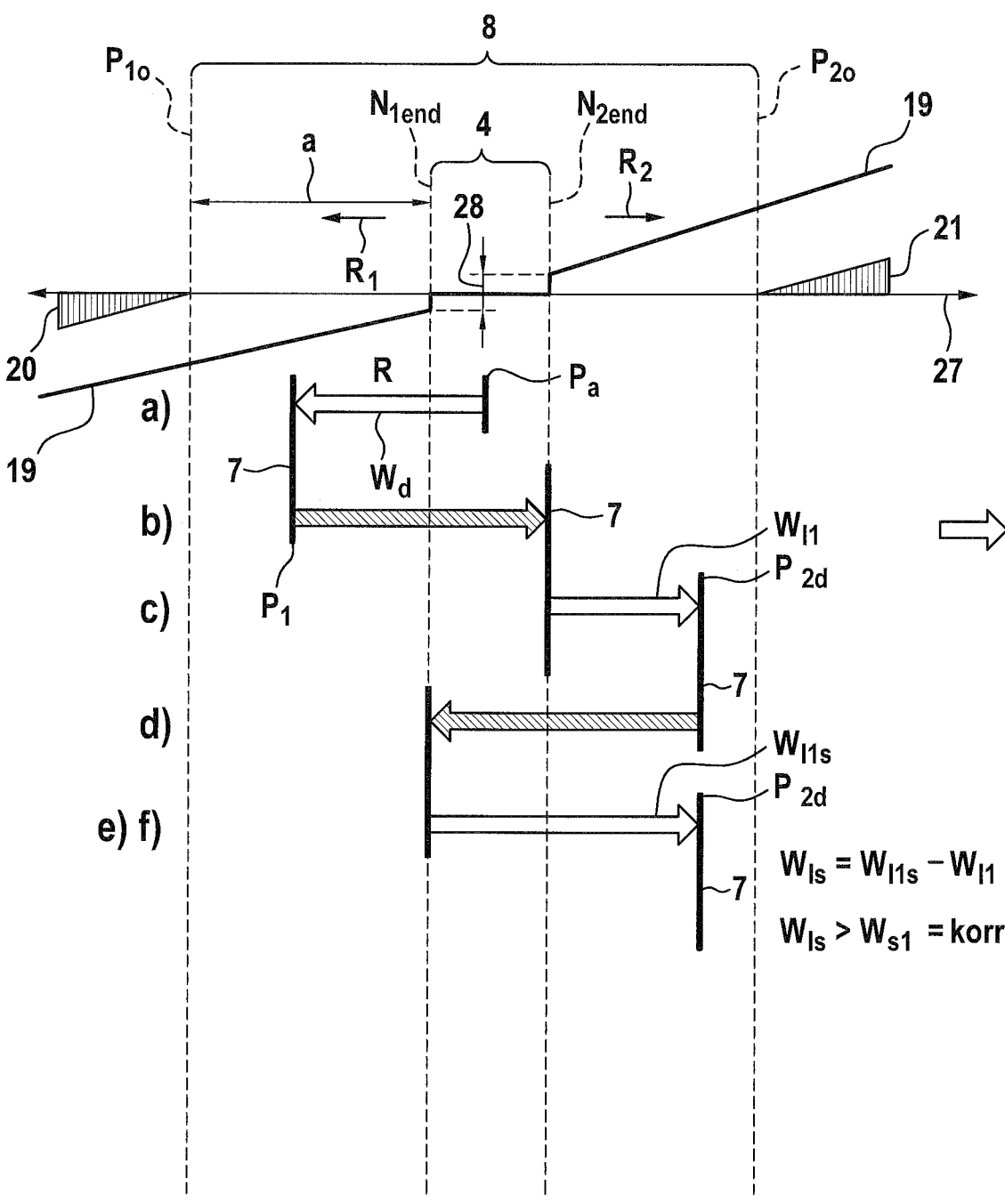
FIG. 4 shows a second flow diagram of the method described.

FIGS. 3 and 4 then show two different embodiment variants of the described method, wherein the embodiment variant according to FIG. 3 is carried out, for example, during an initial commissioning of the system 3 or during a recommissioning after a maintenance or repair, and wherein the embodiment variant according to FIG. 4 can be carried out, for example, as an initializing function during any arbitrary commissioning (after an initial commissioning). First of all, common aspects of FIGS. 3 and 4 will be explained here. FIG. 3 will then be explained and then the explanation of FIG. 4 will build on the explanations for FIG. 3.

FIGS. 3 and 4 each show, plotted on a valve slide position axis 27, the valve slide positions 7 before and after the respective implementation of the individual method steps of the method, wherein the individual method steps each comprise movements of the valve slide 2, which are plotted as arrows. The sequence of method steps a) to g) is in each case represented with one below the other. In the upper part of FIGS. 3 and 4, a characteristic of the spring force 19 of the return spring 6 is in each case plotted schematically against the valve slide position 7. Also plotted schematically against the valve slide position 7 is a first volumetric flow 20 or a second volumetric flow 21 which is established at the outlets of the hydraulic valve 1 in a certain valve slide position 7. There can be seen a first opening point $P_{1o}$, from which a first volumetric flow 20 is provided, and a second opening point $P_{2o}$, from which a second volumetric flow 21 is provided. There is an overlapping region 8 between the first opening point $P_{1o}$, and the second opening point $P_{2o}$. No volumetric flows 20, 21 of hydraulic liquid are provided in present valve slide positions 7 within this overlapping region 8. There is a neutral position 4 within the overlapping region 8.

With regard to the neutral position, it should be pointed out that the diagrams according to FIGS. 3 and 4 each illustrate valve slide positions 7 with respect to the valve drive 5. As can be seen from FIGS. 2a and 2c, the valve slide 7 is preferably clamped with the return spring 6 in a defined and play-free manner. The neutral position 4 is therefore in theory, and with respect to the valve slide 2 itself, preferably a discrete, determined valve slide position 7.

However, owing to elasticities in the system 3, tolerances and, where appropriate, owing to a play in the valve drive 5, there results a play of the system 3 which means that, with respect to the valve drive 5, the neutral position 4 is a valve slide position region which extends from a first neutral position end position $N_{1end}$ up to a second neutral position end position $N_{2end}$. The characteristic of the spring force 19 is also illustrated here with respect to the valve drive 5. It can be seen that the spring force 19 begins to act in each case in the neutral position end positions $N_{1end}$ and $N_{2end}$. The double clamping of the return spring 6 according to FIG. 2a results in the pretensioning force 28 of the spring force 19, which has to be overcome at the neutral position end positions $N_{1end}$ and $N_{2end}$. From there, during further deflection, the spring force 19 preferably further increases linearly or proportionally to the deflection.

According to FIG. 3, first of all, in step a), the valve slide 2 is moved in a first direction $R_1$ and this direction $R_1$ is preferably stored. Preferably, the movement which the valve slide 2 makes in step a) is firmly defined by its length. This is thus preferably a defined path $W_d$ which can be defined, for example, by a fixed number of steps of a stepper motor 10 of the valve drive 5. The starting position $P_a$ before the start of step a) is not precisely known. Since the valve was preferably de-energized before step a), it must lie within the neutral position 4. However, it is not precisely known where within the neutral position 4 the starting position $P_a$ lies. The length of the defined path $W_d$ is preferably fixed in such a way that it is in any case longer than the neutral position 4, with the result that the valve slide 2 is in any case moved out of the neutral position 4, and moreover preferably in any case shorter than a distance a between the respective neutral position end positions $N_{1end}$, $N_{2end}$ and the opening point $P_{1o}$ then following in the respective direction R1. It can thus be ensured that the valve is here also not opened inadvertently. The result of the movement of the valve slide 2 in step a) is that the valve slide 2 is situated in a first valve slide position P1 between the opening point $P_{1o}$ and the neutral position end positions $N_{1end}$, $N_{2end}$.

Then, in step b), the valve drive 5 is deactivated or de-energized or the current present at the valve drive 5 is correspondingly reduced. Consequently, the return spring 6 moves the valve slide 2 counter to the first direction $R_1$ in the second direction $R_2$ back into the neutral position. Owing to its pretensioning, the return spring 6 accelerates the valve slide 2 to such an extent that the valve slide 2 is completely pushed through the neutral position 4 and passes within the neutral position 4 into the second neutral position end position $N_{2end}$. From the first neutral position end position $N_{1end}$, by comparison with the spring force 19 of the return spring 6, only relatively small frictional forces act on the valve slide 2, with the result that the movement of the valve slide 2 through the neutral position 4 occurs very reliably. At the second neutral position end position $N_{2end}$ there then acts the pretensioning force 28 of the return spring 6, which reliably stops the valve slide 2 there. After step b), the valve slide 2 is thus reliably situated in the second neutral position end position $N_{2end}$.

In step c), the valve slide 2 is then moved in the direction R2 up to a defined second valve slide position $P_{2d}$. This defined second valve slide position $P_{2d}$ has to be able to be determined in a reliable manner. This can occur in various ways. Here, it is proposed to use, as defined second valve slide position $P_{2d}$, a second opening point $P_{2o}$ of the hydraulic valve 1. The second opening point $P_{2o}$ can, for example, be reliably detected in that a pressure occurs at a connection of the hydraulic valve 1, or a threshold value for a (small) volumetric flow of hydraulic liquid at the respective connection can be defined as opening point. The valve slide position 7 is actively monitored during the implementation of step c) and a movement of the valve slide 2 in step c) is stopped as soon as the defined second valve slide position $P_{2d}$ has been reached. A first path W1 of the valve slide 2 covered during step c) is determined. That is to say that this path is measured and stored in a control device 11. In the case that the valve drive 5 has a stepper motor 10, this can occur, for example, in that the steps of the stepper motor 10 from the second neutral position end position $N_{2end}$ to the defined second valve slide position $P_{2d}$ are stored.

Then, in step d), the valve drive 5 is deactivated or de-energized again or the current present at the valve drive

5 is correspondingly reduced. Consequently, the return spring 6 moves the valve slide 2 counter to the direction $R_1$ back into the neutral position. Owing to its pretensioning, the return spring 6 accelerates the valve slide 2 to such an extent that the valve slide 2 is completely pushed through the neutral position 4 and passes within the neutral position 4 into the first neutral position end position $N_{1end}$. From the first neutral position end position $N_{1end}$, by comparison with the spring force 19 of the return spring 6, only relatively small frictional forces act on the valve slide 2, with the result that the movement of the valve slide 2 through the neutral position 4 occurs very reliably. At the first neutral position end position $N_{1end}$ there then acts the pretensioning force 28 of the return spring 6, which reliably stops the valve slide 2 there. After step d), the valve slide 2 is thus reliably situated in the first neutral position end position $N_{1end}$.

In step e), the valve slide 2 is then moved in the direction R2 up to the defined second valve slide position $P_{2d}$. Owing to the fact that this defined second valve slide position $P_{2d}$ is able to be reliably determined, it can be moved to in exactly the same way as already in step c).

The valve slide position 7 is also actively monitored during the implementation of step e) and a movement of the valve slide 2 in step e) is stopped as soon as the defined second valve slide position $P_{2d}$ has been reached. A second path $W_{1s}$ of the valve slide 2 covered during step e) is determined. That is to say that this path is measured and stored in a control device 11. In the case that the valve drive 5 has a stepper motor 10, this can occur, for example, in that the steps of the stepper motor 10 from the second neutral position end position $N_{1end}$ to the defined second valve slide position $P_{2d}$ are stored.

The second path $W_{1s}$ and the first path W1 are then present as values. In step f), the play $W_s$ can be calculated as difference of the second path $W_{1s}$ and of the first path $W_1$.

As a further improvement of the described method, FIG. 3 also shows that after step f), as step g), the valve slide 2 can also be moved back up to a first defined position which preferably corresponds to a first opening point $P_{1o}$ of the hydraulic valve 1. Preferably, the first opening point $P_{1o}$ can be defined in exactly the same way as the second opening point $P_{2o}$. In step g), the valve slide 2 moves over the complete overlapping region 8 and covers the overlapping path $W_{ü}$. The overlapping path $W_{ü}$ is preferably also determined during the implementation of the method. The first opening point $P_{1o}$ and the second opening point $P_{2o}$ are preferably stored in a control device 11 and they are preferably available for the operation of the system 3 with the hydraulic valve 1 and the valve drive 5.

The adapted embodiment variant of the described method that is illustrated in FIG. 4 substantially corresponds to the procedure according to FIG. 3. The key difference is that the defined second valve slide position $P_{2d}$, which is in each case moved to in steps c) and e), does not coincide here with the second opening point $P_{2o}$ but deviates therefrom and is preferably situated further in front (within the overlapping region 8) in the second direction $R_2$. Such a defined second valve slide position $P_{2d}$ can be characterized, for example, by a defined spring force 19 of the return spring 8. Such a defined second valve slide position $P_{2d}$ can, for example, be moved to in a targeted manner in that the valve drive 5 or a stepper motor 10 of the valve drive 5 is driven with a reduced drive current. Particularly preferably, a step loss detection of a stepper motor 10 can be used to determine such a defined second valve slide position $P_{2d}$.

An advantage of using such a defined second valve slide position $P_{2d}$, with respect to the defined second valve slide position $P_{2d}$, as second opening point $P_{1o}$ according to FIG. 3, is for example that a play detection is possible without in fact volumetric flows of hydraulic liquid occurring at the hydraulic valve 1. For this reason, this embodiment variant of the method is, for example, particularly suitable for an initializing function for initializing a system 3 consisting of hydraulic valve 1 and valve drive 5 during each commissioning.

According to a particularly preferred embodiment variant, a play $W_{1s}$ determined during an initial commissioning (according to FIG. 3) can then also be compared with a play $W_{1s}$ determined during an arbitrary commissioning after initialization (according to FIG. 4). If the play has increased ($W_{1s} > W_{1s}$), it can be assumed that wear has occurred. If this wear lies in an intended range, stored parameters for the operation of the system 3 can be adapted and the further operation of the system 3 can occur as intended. If a smaller play than during the initial commissioning has been determined ($W_{1s} < W_{1s}$), it is possible, where appropriate, also to output an error message because a reduction in the present and predetermined play cannot occur.

The method described here has been used to describe a novel and very efficient approach for determining the play in systems 3 having a hydraulic valve 1 and valve drive 5.

LIST OF REFERENCE SIGNS

1 Hydraulic valve
2 Valve slide
3 System
4 Neutral position
5 Valve drive
6 Return spring
7 Valve slide position
8 Overlapping region
9 Hydraulic line
10 Stepper motor
11 Control device
12 Hydraulic system
13 Control structure
14 Valve block
15 Gear mechanism
16 Sensors
17 Hydraulic supply
18 Differential cylinder
19 Spring force
20 First volumetric flow
21 Second volumetric flow
22 Control bore
23 Clamping device
24 Transmission element
25 Shoulder
26 Counter-holding structures
27 Valve slide position axis
28 Pretensioning force
$R_1$ First direction
$R_2$ Second direction
$P_i$ First valve slide position
$P_{1d}$ Defined first valve slide position
$P_{2d}$ Defined second valve slide position
$P_a$ Starting position
$W_1$ First path
$W_{1s}$ Second path
$W_s$ Play
$W_{\ddot{u}}$ Overlapping path
$W_d$ Defined path
A First outlet B Second outlet
P Pressure connection
T Tank connection
$N_{1end}$ First neutral position end position
$N_{2end}$ Second neutral position end position
$P_{1o}$ First opening point
$P_{2o}$ Second opening point
a Distance

The invention claimed is:

1. A method for detecting a mechanical play ($W_s$) in a system having a hydraulic valve and a valve drive drivable by an electrical current for driving the hydraulic valve, wherein a valve slide, which is driven by the valve drive, of the hydraulic valve is secured by spring action of a return spring which is configured, in a case of the valve drive being de-energized, to push the valve slide from any arbitrary valve slide position back into a neutral position of the valve slide, the method comprising steps of:
   a) moving the valve slide by the valve drive in a first direction ($R_1$) up to a first valve slide position ($P_1$) away from the neutral position of the valve slide;
   b) reducing the electrical current at the valve drive such that the valve slide is moved by the return spring in a second direction ($R_2$) counter to the first direction ($R_1$) back into the neutral position of the valve slide;
   c) moving the valve slide by the valve drive further in the second direction ($R_2$) up to a defined second position ($P_{2d}$) away from the neutral position of the valve slide and determining a first path ($W_1$) from the neutral position of the valve slide to the defined second position ($P_{2d}$);
   d) reducing the electrical current at the valve drive such that the valve slide is moved by the return spring in the first direction ($R_1$) back into the neutral position of the valve slide;
   e) moving the valve slide by the valve drive in the second direction ($R_2$) up to the defined second position ($P_{2d}$) away from the neutral position of the valve slide and determining a second path ($W_{1s}$) from the neutral position of the valve slide to the defined second position ($P_{2d}$); and
   f) calculating the mechanical play ($W_s$) as a difference between the determined second path ($W_{1s}$) and the determined first path ($W_1$).

2. The method as claimed in claim 1, wherein the neutral position of the valve slide is a neutral position region which extends from a first neutral position end position ($N_{1end}$) up to a second neutral position end position ($N_{2end}$), and wherein, in step b), the valve slide is pressed by the return spring into the second neutral position end position ($N_{2end}$) and, in step d), the valve slide is pressed by the return spring into the first neutral position end position ($N_{1end}$).

3. The method as claimed in claim 1, wherein the neutral position of the valve slide is arranged within an overlapping region between two opening points ($P_{1o}$, $P_{2o}$) of the hydraulic valve, and wherein hydraulic lines of the hydraulic valve are closed if the valve slide position lies within the overlapping region and an opening of the hydraulic lines begins at the two opening points ($P_{1o}$, $P_{2o}$).

4. The method as claimed in claim 3, wherein, in step a), a defined safe path ($W_d$) is travelled which is shorter than a distance between a neutral position end position ($N_{1end}$, $N_{2end}$) and a corresponding opening point ($P_{1o}$, $P_{2o}$) of the hydraulic valve.

5. The method as claimed in claim 3, wherein the first valve slide position ($P_1$) moved to in step a) and/or the defined second position ($P_{2d}$) moved to in step c) are arranged within the overlapping region of the valve slide.

6. The method as claimed in claim 1, wherein the valve drive has a stepper motor, and wherein measurements of the first path ($W_1$) and the second path ($W_{1s}$) are performed by counting steps of the stepper motor.

7. The method as claimed claim 1, wherein steps a) to f) are performed during an initial commissioning of the system and/or during a recommissioning of the system after a repair or maintenance and at least the play ($W_s$) calculated in step f) is stored in a control device for operating the system.

8. The method as claimed in claim 1, wherein the defined second position ($P_{2d}$) moved to in step c) and step e) is an opening point ($P_{2o}$) of the hydraulic valve which, in step c) and step e), is detected based on a hydraulic property in the hydraulic valve and/or in a hydraulic system connected to the hydraulic valve.

9. The method as claimed in claim 8 comprising, after step e):

g) moving the valve slide in the first direction up to a defined first position ($P_{1d}$); and wherein the defined second position ($P_{2d}$) moved to in step c) and step e) and the defined first position ($P_{1d}$) moved to in step g) are opening points ($P_{1o}$, $P_{2o}$) of the hydraulic valve which, in steps c), e) and g), are detected based on a hydraulic property in the hydraulic valve and/or in the hydraulic system connected to the hydraulic valve.

10. The method as claimed in claim 1, wherein the defined second position ($P_{2d}$) moved to in step c) and step e) is defined by a spring force of the return spring of the hydraulic valve, and wherein the spring force is detected in the valve drive in step c) and step e).

11. The method as claimed in claim 1, wherein the defined second position ($P_{2d}$) moved to in step c) and step e) is detected, the electrical current at the valve drive is reduced, the valve drive is controlled with the reduced electrical current at the valve drive, and a valve slide position, which is achieved with the reduced electrical current at the valve drive, is the second defined position ($P_{2d}$).

12. The method as claimed in claim 1, wherein the defined second position ($P_{2d}$) moved to in step c) and step e) is detected on an occurrence of a step loss which occurs on a stepper motor of the valve drive and which is detected with a step loss detection module configured therefor in a control device of the valve drive.

13. The method as claimed in claim 1, wherein method steps a) to f) are performed during a renewed commissioning of the system after an initial commissioning of the system and/or after a recommissioning of the system after a repair or maintenance and parameters determined in steps a) to f) are compared with parameters stored in a control device to obtain a comparison result, the parameters stored in the control device having been determined during a previous implementation of steps a) to f), and, based on the comparison result, wear of the system comprising the hydraulic valve and the valve drive is determined.

\* \* \* \* \*